United States Patent
Kadambala et al.

(10) Patent No.: US 12,489,987 B2
(45) Date of Patent: Dec. 2, 2025

(54) IMAGE PROCESSING RESOURCE SHARING FOR IMAGE SENSORS

(71) Applicant: QUALCOMM Incorporated, San Diego, CA (US)

(72) Inventors: Ravi Shankar Kadambala, Hyderabad (IN); Venu Madhav Raidu, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 211 days.

(21) Appl. No.: 18/479,482

(22) Filed: Oct. 2, 2023

(65) Prior Publication Data
US 2025/0113109 A1    Apr. 3, 2025

(51) Int. Cl.
*H04N 23/80* (2023.01)
*H04N 23/45* (2023.01)
*H04N 23/65* (2023.01)
*H04N 23/667* (2023.01)
*H04N 23/67* (2023.01)

(52) U.S. Cl.
CPC ............ *H04N 23/80* (2023.01); *H04N 23/45* (2023.01); *H04N 23/667* (2023.01); *H04N 23/67* (2023.01); *H04N 23/651* (2023.01)

(58) Field of Classification Search
CPC ...... H04N 23/80; H04N 23/45; H04N 23/667; H04N 23/67; H04N 23/651; H04N 13/239; H04N 23/66; H04N 23/90; H04N 13/25; H04N 23/665
See application file for complete search history.

(56) References Cited

U.S. PATENT DOCUMENTS

| | | | |
|---|---|---|---|
| 2008/0219654 A1* | 9/2008 | Border | H04N 23/673 396/89 |
| 2012/0120256 A1* | 5/2012 | Hwang | H04N 23/951 348/207.1 |
| 2019/0007590 A1* | 1/2019 | Lee | H04N 23/698 |
| 2019/0068869 A1 | 2/2019 | Kadambala et al. | |
| 2020/0236286 A1* | 7/2020 | Park | H04N 23/90 |
| 2023/0011755 A1* | 1/2023 | Choi | H04N 23/951 |

FOREIGN PATENT DOCUMENTS

EP    3084683 B1    8/2020

OTHER PUBLICATIONS

International Search Report and Written Opinion—PCT/US2024/040180—ISA/EPO—Oct. 18, 2024.

* cited by examiner

*Primary Examiner* — Gevell V Selby
(74) *Attorney, Agent, or Firm* — NORTON ROSE FULBRIGHT US LLP

(57) ABSTRACT

An apparatus includes a first image processing path associated with a first image sensor and a second image processing path associated with a second image sensor. The apparatus further includes a multiplexer (MUX). The MUX is configured to provide data from the first image sensor to the second image processing path in accordance with a resource availability parameter associated with the second image processing path satisfying a resource availability condition.

23 Claims, 7 Drawing Sheets

IMAGE PROCESSING RESOURCE SHARING FOR IMAGE SENSORS

TECHNICAL FIELD

Aspects of the present disclosure relate generally to image processing, and more particularly, to image processing resource sharing for image sensors.

INTRODUCTION

Image capture devices may capture one or more digital images, such as still images for photos or sequences of images for videos. Image capture devices may be incorporated into a wide variety of devices. For example, image capture devices may be incorporated into stand-alone digital cameras or digital video camcorders, camera-equipped wireless communication device handsets (such as cellular telephones, satellite radio telephones, personal digital assistants (PDAs), and tablets), gaming devices, computing devices (such as webcams and video surveillance cameras), and other devices with digital imaging or video capabilities.

Some image capture devices may generate a relatively large amount of data. For example, some image capture devices may generate both a stream of images and a stream of data for autofocusing, such as phase detection autofocus (PDAF) data. Such data may be processed and buffered or stored at a memory. As the amount of data grows, latency may result. Such latency may be undesirable or infeasible in some implementations, such as, for example, in some extended reality (XR) implementations.

To reduce or avoid such latency, some image capture devices may increase power consumption, such as using a "turbo" image processing mode. Such an increase in power consumption may be undesirable or infeasible in some implementations, such as in certain battery-powered image capture device implementations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its purpose is to present some concepts of one or more aspects of the disclosure in summary form as a prelude to the more detailed description that is presented later.

In one aspect of the disclosure, an apparatus includes a first image processing path associated with a first image sensor, a second image processing path associated with a second image sensor, and a multiplexer (MUX). The MUX is configured to provide data from the first image sensor to the second image processing path in accordance with a resource availability parameter associated with the second image processing path satisfying a resource availability condition.

In another aspect of the disclosure, an apparatus includes a first image processing path configured to receive an image signal associated with a first image sensor and to generate image data in accordance with the image signal. The apparatus further includes a second image processing path configured to receive, in accordance with a resource availability parameter associated with the second image processing path satisfying a resource availability condition, an autofocus signal associated with a second image sensor and to generate autofocus data in accordance with the autofocus signal. The apparatus further includes a decoder configured to receive the image data from the first image processing path and to receive the autofocus data from the second image processing path.

In another aspect of the disclosure, a method includes receiving, at a first image processing path, a first image signal associated with a first image sensor. The method further includes, based on a resource availability parameter associated with a second image processing path satisfying a resource availability condition, receiving data from the first image sensor at the second image processing path. The second image processing path is associated with a second image sensor.

In another aspect of the disclosure, a method includes receiving, at a first image processing path, an image signal associated with a first image sensor. The method further includes generating image data in accordance with the image signal and receiving, at a second image processing path, an autofocus signal associated with a second image sensor in accordance with a resource availability parameter associated with the second image processing path satisfying a resource availability condition. The method further includes generating autofocus data in accordance with the autofocus signal and receiving, at one or more shared image processing components associated with the first image processing path and the second image processing path, the image data and the autofocus data.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
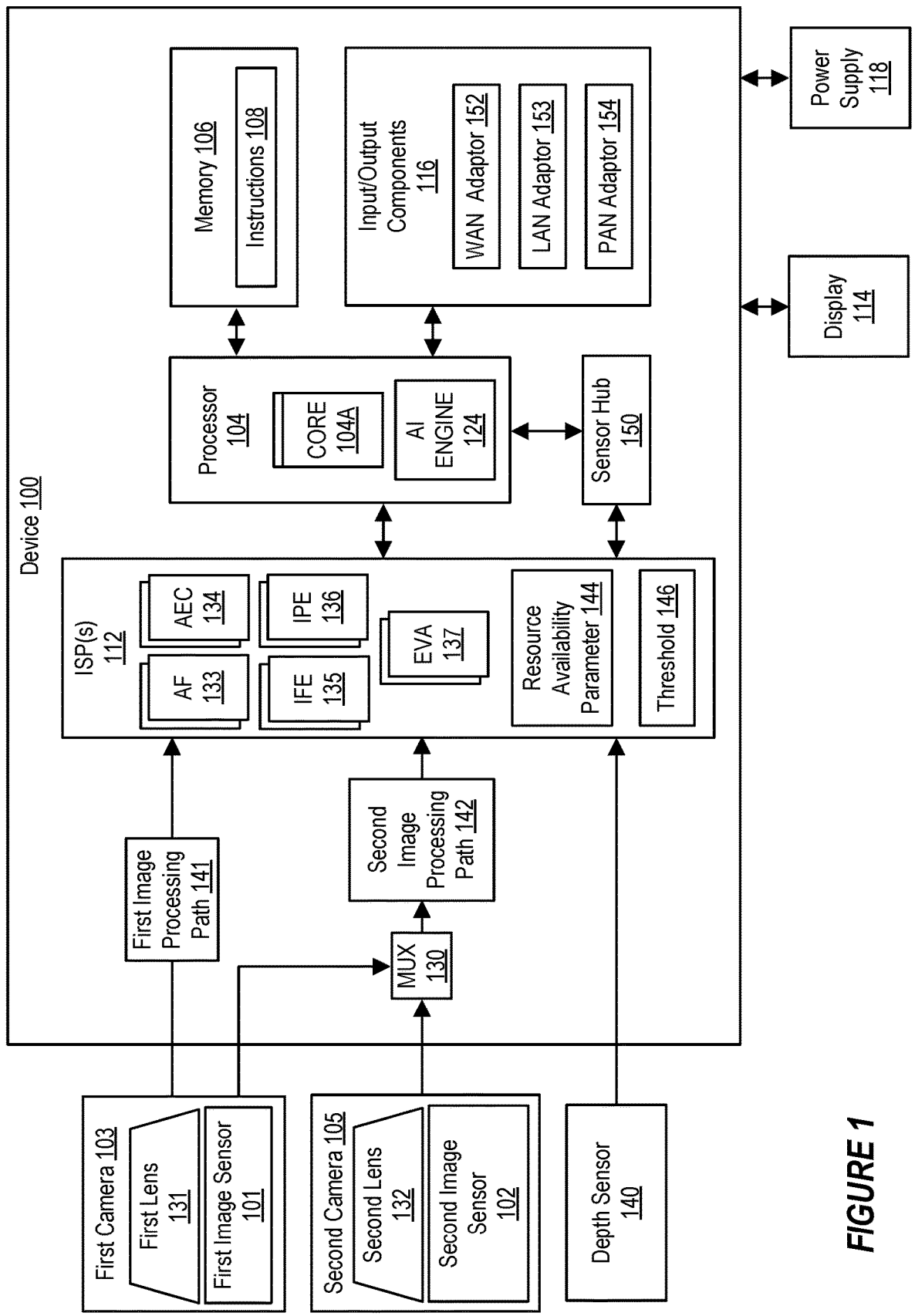
FIG. 1 is a diagram of an example device for image processing resource sharing among image sensors according to some aspects of the disclosure.

In some aspects of the disclosure, a device may include multiple image sensors and multiple image processing paths respectively associated with the multiple image sensors. If one of the image sensors is idle, the device may dynamically reassign the image processing path associated with the idle image sensor to a non-idle image sensor. In such examples, multiple image processing paths may process signals associated with the non-idle image sensor. For example, the signals may include an image signal and an autofocus signal (such as a phase detection autofocus (PDAF) signal) generated by the non-idle image sensor.

To further illustrate, in some examples, the device may include a front-facing camera and a rear-facing camera. In an example, if the front-facing camera is in use, the device may reassign the image processing path associated with the rear-facing camera to the front-facing camera. In another example, if the rear-facing camera is in use, the device may reassign the image processing path associated with the front-facing camera to the rear-facing camera.

In some circumstances, dynamically reassigning resources from one image sensor to another image sensor may improve performance of an electronic device. For example, by dynamically reassigning resources from one image sensor to another image sensor, a device may avoid initiating a "turbo" mode of operation. Further, an idle (or "sleeping") image sensor may remain in an idle or sleep mode while image processing resources associated with the image sensor are shared with another image sensor. As a result, power consumption may be reduced without increasing latency.

The detailed description, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, structures and components are shown in block diagram form for clarity of presentation.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some embodiments, the camera module may include one or more components including the image sensor included in a single package with an interface configured to couple the camera module to an image signal processor or other processor through a bus.

FIG. 1 is a diagram of an example device 100 for image processing resource sharing among image sensors according to some aspects of the disclosure. The device 100 may include, or otherwise be coupled to, one or more image signal processors (e.g., one or more ISPs 112) for processing image frames from one or more image sensors, such as a first image sensor 101, a second image sensor 102, and a depth sensor 140. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor, as illustrative examples. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some embodiments, antennas may be shared for communicating on different networks by the WAN adaptor 152, LAN adaptor 153, and/or PAN adaptor 154. In some embodiments, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or may be coupled to a power supply 118 for the device 100, such as a battery or an adaptor to couple the device 100 to an energy source. The device 100 may also include or may be coupled to additional features or components that are not shown in FIG. 1. In one example, a wireless interface, which may include one or more transceivers and a baseband processor in a radio frequency front end (RFFE), may be coupled to or may be included in WAN adaptor 152 for a wireless communication device. In a further example, an analog front end (AFE) to convert analog image data to digital image data may be coupled between the first image sensor 101 or second image sensor 102 and processing circuitry in the device 100. In some embodiments, AFEs may be embedded in the one or more ISPs 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the one or more ISPs 112 and/or the processor 104.

The one or more ISPs 112 may receive captured image data. In one embodiment, a local bus connection couples the one or more ISPs 112 to the first image sensor 101 and second image sensor 102 of a first camera 103 and second camera 105, respectively. In another embodiment, a wire interface couples the one or more ISPs 112 to an external image sensor. In a further embodiment, a wireless interface couples the one or more ISPs 112 to the first image sensor 101 or second image sensor 102.

The first image sensor 101 and the second image sensor 102 are configured to capture image data representing a scene in the field of view of the first camera 103 and second camera 105, respectively. In some embodiments, the first camera 103 and/or second camera 105 output analog data, which is converted by an analog front end (AFE) and/or an analog-to-digital converter (ADC) in the device 100 or embedded in the one or more ISPs 112. In some embodiments, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated autofocus (AF) algorithm (e.g., AF 133) executing in the one or more ISPs 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of UW, W, tele (T), and ultra-tele (UT) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some embodiments, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

The one or more ISPs 112 may process one or more image frames captured by the first camera 103, the second camera 105, or both. While FIG. 1 illustrates the device 100 as including first camera 103 and second camera 105, any quantity (e.g., one, two, three, four, five, six, etc.) of cameras may be coupled to the one or more ISPs 112. In some aspects, depth sensors such as depth sensor 140 may be coupled to the one or more ISPs 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), mmWave, and/or hybrid depth sensors, such as structured light sensors. In embodiments without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some embodiments, the one or more ISPs 112 may execute instructions from a memory, such as instructions 108 from the memory 106, instructions stored in a separate memory coupled to or included in the one or more ISPs 112, or instructions provided by the processor 104. In addition, or in the alternative, the one or more ISPs 112 may include specific hardware (such as one or more integrated circuits (ICs)) configured to perform one or more operations described in the present disclosure. For example, the one or more ISPs 112 may include image front ends (e.g., IFE 135), image post-processing engines (e.g., IPE 136), auto exposure compensation (AEC) engines (e.g., AEC 134), and/or one or more engines for video analytics (e.g., EVA 137). An image pipeline may be formed by a sequence of one or more of the IFE 135, IPE 136, and/or EVA 137. In some embodiments, the image pipeline may be reconfigurable in the one or more ISPs 112 by changing connections between the IFE 135, IPE 136, and/or EVA 137. The AF 133, AEC 134, IFE 135, IPE 136, and EVA 137 may each include application-specific circuitry, be embodied as software or firmware executed by the one or more ISPs 112, and/or a combination of hardware and software or firmware executing on the one or more ISPs 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the one or more ISPs 112.

In addition to instructions 108, the memory 106 may also store image frames. The image frames may be output image frames stored by the one or more ISPs 112. The output image frames may be accessed by the processor 104 for further operations. In some embodiments, the device 100 does not include the memory 106. For example, the device 100 may be a circuit including the one or more ISPs 112, and the memory may be outside the device 100. The device 100 may be coupled to an external memory and configured to access the memory for writing output image frames for display or long-term storage. In some embodiments, the device 100 is a system-on-chip (SoC) that incorporates the one or more ISPs 112, the processor 104, the sensor hub 150, the memory 106, and/or components 116 into a single package.

In some embodiments, at least one of the one or more ISPs 112 or the processor 104 executes instructions to perform, initiate, or control one or more operations described herein. For example, execution of the instructions can instruct the one or more ISPs 112 to begin or end capturing an image frame or a sequence of image frames, in which the capture includes correction as described in embodiments herein. In some embodiments, the processor 104 may include one or more general-purpose processor cores 104A-N capable of executing instructions to control operation of the one or more ISPs 112. For example, the cores 104A-N may execute a camera application (or other suitable application for generating images or video) stored in the memory 106 that activate or deactivate the one or more ISPs 112 for capturing image frames and/or control the one or more ISPs 112. The operations of the cores 104A-N and the one or more ISPs 112 may be based on user input. For example, a camera application executing on processor 104 may receive a user command to begin a video preview display upon which a video comprising a sequence of image frames is captured and processed from first camera 103 and/or the second camera 105 through the one or more ISPs 112 for display and/or storage. Image processing to determine "output" or "corrected" image frames, such as according to techniques described herein, may be applied to one or more image frames in the sequence.

In some embodiments, the processor 104 may include one or more ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other embodiments, the device 100 does not include the processor 104, such as when all of the described functionality is configured in the one or more ISPs 112.

In some embodiments, the display 114 may include one or more displays or screens that enable user interaction and/or presentation of items to the user, such as a preview of the output of the first camera 103 and/or second camera 105. In some embodiments, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the one or more ISPs 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the one or more ISPs 112 is illustrated as separate from the processor 104, the one or more ISPs 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

In the example illustrated in FIG. 1, the device 100 includes a first image processing path 141 associated with the first image sensor 101 and further includes a second image processing path 142 associated with second image sensor 102. FIG. 1 also illustrates that the device 100 may include a multiplexer (MUX) 130. The MUX 130 may include a first input coupled to the first image sensor 101, a second input coupled to the second image sensor 102, and an output coupled to the second image processing path 142. The first image processing path may be coupled to the first image sensor 101 and to one or more components shared among the first image processing path 141 and the second image processing path 142, such as the one or more ISPs 112. The second image processing path 142 may be coupled to the MUX 130 and to the one or more components (e.g., the one or more ISPs 112).

In some aspects of the disclosure, the device 100 may determine a resource availability parameter 144 associated with the second image processing path 142. For example, in some implementations, an ISP of the one or more ISPs 112 may determine the resource availability parameter 144. In some examples, the resource availability parameter 144 may be based on a status associated with the second image sensor 102 or the second camera 105. For example, during operation of the device 100, the second image sensor 102 may operate according to a first mode (such as an active mode during which the second image sensor 102 captures one or more images) and a second mode (such as an idle mode during which the second image sensor 102 does not capture one or more images).

The resource availability parameter 144 may be associated with a particular mode of the second image sensor 102. For example, the particular mode may include or correspond to the second mode (such as an idle mode). In some examples, the resource availability parameter 144 may indicate whether the second image sensor 102 is associated with the first mode or the second mode or may indicate an amount of time the second image sensor 102 has been associated with the second mode. For example, if the one or more ISPs 112 initiate (or are scheduled to initiate) an image capture operation using the second image sensor 102, the one or more ISPs 112 may set the resource availability parameter 144 to indicate the first mode. At other times, the one or more ISPs 112 may set the resource availability parameter 144 to indicate the second mode. For example, after the second image sensor 102 completes the image capture operation using the second image sensor 102, the one or more ISPs 112 may set the resource availability parameter 144 to indicate the second mode. In some examples, the resource availability parameter 144 may include or may be associated with a timestamp indicating a time at which the second image sensor 102 is set to the second mode.

During operation, the one or more ISPs 112 may monitor whether the resource availability parameter 144 satisfies a resource availability condition, such as by exceeding a threshold 146. For example, the resource availability parameter 144 may exceed the threshold 146 based on the second image sensor 102 being idle for at least a particular time interval. In some examples, the one or more ISPs 112 may determine that the second image sensor 102 is associated with the idle mode of operation for at least the particular time interval using a timestamp that may be included in or associated with the resource availability parameter 144.

In some examples, the resource availability parameter 144 may fail to exceed the threshold 146. In such examples, the device 100 may use the MUX 130 to provide data from the second image sensor 102 to the second image processing path 142. For example, the one or more ISPs 112 may set a control signal of the MUX 130 to a first value (such as a logic "0" value or a logic "1" value) to couple the second image sensor 102 to the second image processing path 142 and to cause the MUX 130 to provide the data from the second image sensor 102 to the second image processing path 142.

In some other examples, the resource availability parameter 144 may exceed the threshold 146. Based on the resource availability parameter 144 exceeding the threshold 146, the device 100 may use the MUX 130 to provide data from the first image sensor 101 to the second image processing path 142. For example, the one or more ISPs 112 may set the control signal of the MUX 130 to a second value (such as a logic "1" value or a logic "0" value) to couple the first image sensor 101 to the second image processing path 142 and to cause the MUX 130 to provide the data from the first image sensor 101 to the second image processing path 142. The data may include an autofocus (AF) signal, such as a phase detection autofocus (PDAF) signal.

Based on a change associated with the resource availability parameter 144, the device 100 may set the control signal to the MUX 130 to the first value to couple the second image sensor 102 to the second image processing path 142. For example, if the second camera 105 is to initiate an image capture operation, the mode of the second image sensor 102 may change from an idle mode to an active mode. In such examples, the device 100 may adjust the control signal from the second value to the first value to couple the second image sensor 102 to the second image processing path 142.

In some implementations, the resource availability parameter 144 may correspond to or may be associated with a mode of operation of the device 100. In some such examples, the one or more ISPs 112 may determine whether the resource availability parameter 144 satisfies a resource availability condition, based at least in part on a mode of operation of the device 100 corresponding to a particular mode, or based on an amount of time the device 100 operates according to the mode satisfying a threshold amount of time. To illustrate, in some examples, the device 100 may include a front-facing camera (e.g., the first camera 103 or the second camera 105) and a rear-facing camera (e.g., the second camera 105 or the first camera 103). In an example, if the front-facing camera is in use, the device 100 may determine that the resource availability parameter 144 satisfies the resource availability condition and may reassign an image processing path associated with the rear-facing camera to the front-facing camera. In another example, if the rear-facing camera is in use, the device 100 may determine that the resource availability parameter 144 satisfies the resource availability condition and may reassign an image processing path associated with the front-facing camera to the rear-facing camera.

To further illustrate, in some examples, one of the first camera 103 and the second camera 105 may be associated with head tracking, and the other of the first camera 103 and the second camera 105 may be associated with plane finding and controller tracking. In some circumstances, head tracking may be enabled while plane finding and controller tracking is (at least temporarily) disabled (or vice versa). In such examples, image processing resources associated with plane finding and controller tracking may be allocated to head tracking (or vice versa). Other examples are also within the scope of the disclosure.

Figure 2:
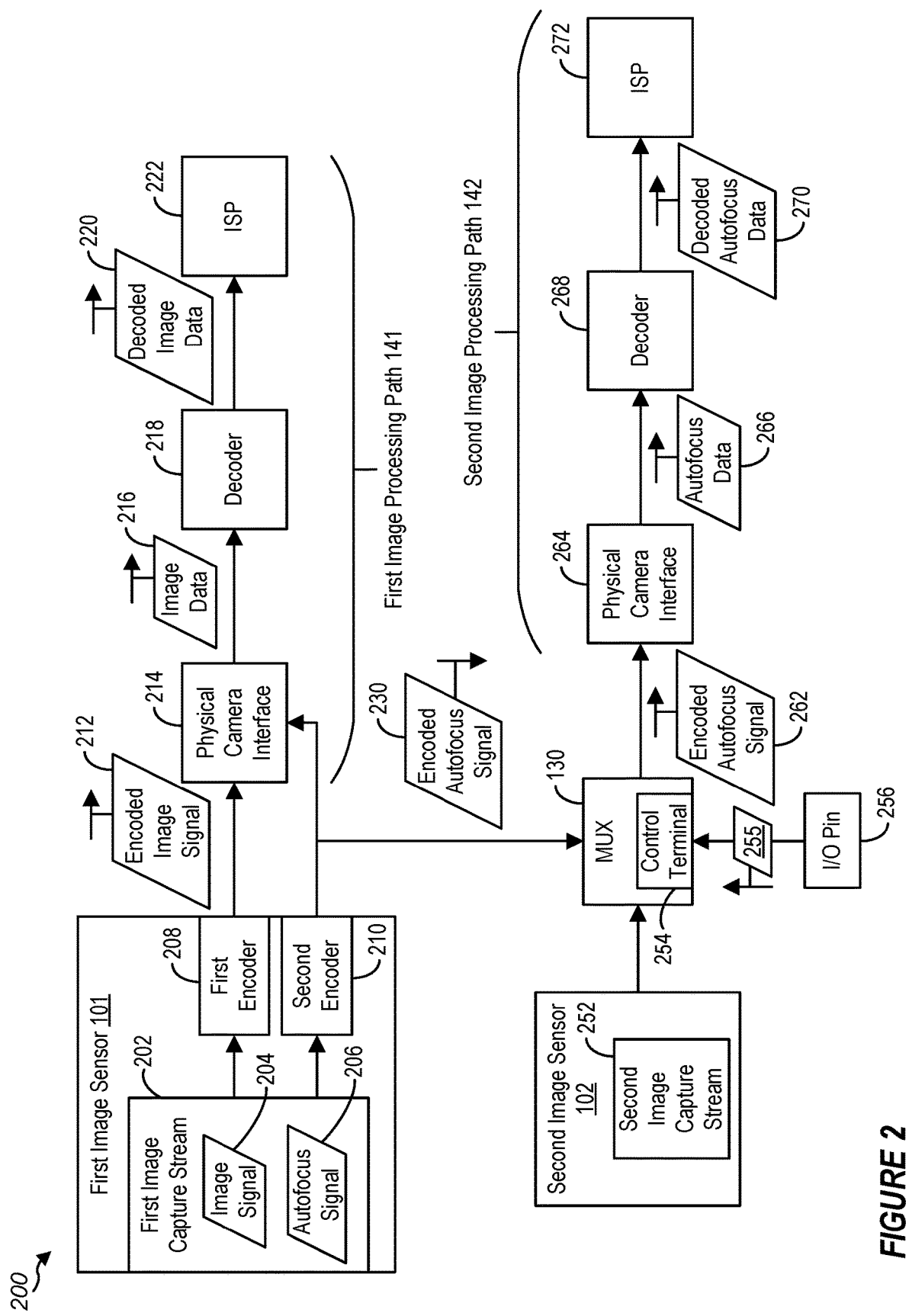
FIG. 2 is a diagram of another example device for image processing resource sharing among image sensors according to some aspects of the disclosure.

FIG. 2 is a diagram of an example device 200 for image processing resource sharing among image sensors according to some aspects of the disclosure. The device 200 may include one or more features described with reference to FIG. 1. For example, the device 200 may include the first image sensor 101, the second image sensor 102, the MUX 130, the first image processing path 141, and the second image processing path 142. In some examples, the device 200 is included in or corresponds to the device 100 of FIG. 1.

In the example of FIG. 2, the first image sensor 101 may include multiple encoders, such as a first encoder 208 and a second encoder 210. In some examples, the first encoder 208 and the second encoder 210 may each include or correspond to a mobile industry processor interface (MIPI) encoder. In some other examples, one or both of the first encoder 208 or the second encoder 210 may each include or correspond to another type of encoder, such as an encoder of a standalone camera or a wearable device, such as a headset, as illustrative examples.

The MUX 130 may include a control terminal 254. The control terminal 254 may be coupled to an input/output (I/O) pin 256 of the device 200. In some examples, the I/O pin 256 may correspond to a pin of an integrated circuit, such as a system on chip (SoC). In some examples, the I/O pin 256 may be a general purpose input/output (GPIO) pin. The MUX 130 may also be coupled to the first image sensor 101 (e.g., to the second encoder 210) and to the second image sensor 102 (e.g., to one or more encoders of the second image sensor 102).

FIG. 2 also illustrates that the first image processing path 141 may include one or more of a physical camera interface 214, a decoder 218, and an ISP 222. The physical camera interface 214 may be coupled to the first image sensor 101 (e.g., to the first encoder 208 and the second encoder 210) and may also be coupled to the decoder 218. The decoder 218 may be coupled to the physical camera interface 214 and to the ISP 222. The ISP 222 may be coupled to the decoder 218.

Further, the second image processing path 142 may include one or more of a physical camera interface 264, a decoder 268, and an ISP 272. The physical camera interface 264 may be coupled to the MUX 130 and to the decoder 268. The decoder 268 may be coupled to the physical camera interface 264 and to the ISP 272. The ISP 272 may be coupled to the decoder 268. In some examples, one or both of the ISPs 222, 272 may be included in or may correspond to the one or more ISPs 112 of FIG. 1.

During operation, the first image sensor 101 may generate a first image capture stream 202, and the second image sensor 102 may generate a second image capture stream 252. One or both of the first image capture stream or the second image capture stream 252 may include or be associated with an image signal, an autofocus signal, or both. For example, the first image capture stream 202 may include or may be associated with an image signal 204 and an autofocus signal 206. In some examples, the autofocus signal 206 may include or correspond to a PDAF signal.

The first encoder 208 may encode the image signal 204 to generate an encoded image signal 212. The second encoder 210 may encode the autofocus signal 206 to generate an encoded autofocus signal 230. The encoded image signal 212 and the encoded autofocus signal 230 may have a particular encoding format, such as a MIPI encoding format.

The physical camera interface 214 may receive one or both of the encoded image signal 212 or the encoded autofocus signal 230. The physical camera interface 214 may perform analog-to-digital conversion of signals from the first image sensor 101. For example, the physical camera interface 214 may perform analog-to-digital conversion of the encoded image signal 212 to generate image data 216.

The decoder 218 may receive image data from the physical camera interface 214 and may decode the image data to generate decoded image data. For example, the decoder 218 may receive the image data 216 from the physical camera interface 214 and may decode the image data 216 to generate decoded image data 220.

The ISP 222 may receive decoded data from the decoder 218 and may perform image processing of the decoded data. For example, the ISP 222 may receive the decoded image data 220 from the decoder 218 and may perform image processing of the decoded image data 220.

In some circumstances, processing of both the encoded image signal 212 and the encoded autofocus signal 230 by the first image processing path 141 may be associated with relatively high latency, relatively high power consumption, or both. To illustrate, in some implementations, the first image processing path 141 may process (or may be able to process) multiple signals in parallel with one another, such as by processing both the encoded image signal 212 and the encoded autofocus signal 230 in parallel with one another, which may reduce or avoid latency associated with serially processing such signals.

In some implementations, parallel processing of the encoded image signal 212 and the encoded autofocus signal 230 by the first image processing path 141 may increase device power consumption, such as by increasing device power consumption as compared to serial processing of such signals. To illustrate, parallel processing of such signals may trigger the device 200 to initiate a "turbo" mode of operation that may increase power consumption to facilitate the parallel processing. For example, in some implementations, the encoded image signal 212 may be associated with a first clock frequency that is different than a second clock frequency associated with the encoded autofocus signal 230. To enable the parallel processing of the encoded image signal 212 and the encoded autofocus signal 230, the device 200 may initiate a turbo mode in which power consumption is increased. As a non-limiting, illustrative example, in some implementations, the encoded image signal 212 may be associated with a first clock frequency of 480 megahertz (MHz), and the encoded autofocus signal 230 may be associated with a second clock frequency of 120 MHz. To facilitate an overall clock frequency of 480 MHz+120 MHz=600 MHz, the device 200 may initiate the turbo mode of operation, increasing power consumption.

In some aspects of the disclosure, the device 200 may perform sharing of image processing resources to reduce or avoid instances of initiating the turbo mode of operation. To illustrate, the MUX 130 may selectively couple the second image processing path 142 to one of the first image sensor 101 (e.g., the second encoder 210) or the second image sensor 102. For example, while the second image sensor 102 generates the second image capture stream 252, the device 200 may set a first value of a control signal 255 provided (e.g., via the I/O pin 256) to the control terminal 254. Based on the first value of the control signal 255, the MUX 130 may couple the physical camera interface 264 to the second image sensor 102. In such examples, the first image processing path 141 may process data associated with the first image capture stream 202 (such as the encoded image signal 212 and the encoded autofocus signal 230), and the second image processing path 142 may process data associated with the second image capture stream 252 (such as one or both of an image signal or an autofocus signal associated with the second image capture stream 252).

In some other examples, if the second image sensor 102 is not generating the second image capture stream 252, the device 200 may set a second value of the control signal 255 provided to the control terminal 254. Based on the second value of the control signal 255, the MUX 130 may couple the physical camera interface 264 to the first image sensor 101 (e.g., to the second encoder 210). In such examples, the first image processing path 141 may process the encoded image signal 212, and the second image processing path 142 may process the encoded autofocus signal 230.

To illustrate, the second image processing path 142 may receive the encoded autofocus signal 262 and may perform analog-to-digital conversion of the encoded autofocus signal 262 using the physical camera interface 264 to generate autofocus data 266. The decoder 268 may receive the autofocus data 266 and may decode the autofocus data 266 to generate decoded autofocus data 270. The ISP 272 may receive the decoded autofocus data 270 and may perform image processing of the decoded autofocus data 270.

In some examples, the MUX 130 may provide data from the first image sensor 101 to the second image processing path 142 in accordance with the resource availability parameter 144 of FIG. 1 satisfying a resource availability condition, such as by exceeding the threshold 146, as described with reference to FIG. 1. As an illustrative example, the ISP 272 (or another device, such as the processor 104 of FIG. 1) may monitor operation of the second image sensor 102 and may set a value of the control signal 255 provided to the control terminal 254 according to a mode of operation of the second image sensor 102. In some examples, the MUX 130 is configured to provide, as the data, one of the encoded autofocus signal 230 or a signal associated with the second image capture stream 252 (e.g., an encoded image signal or an encoded autofocus signal associated with the second image capture stream 252) to the second image processing path 142. The MUX 130 may provide the signal associated with the second image capture stream 252 to the second image processing path 142 in accordance with the resource availability parameter 144 failing to exceed the threshold 146.

One or more of the ISP 222, the ISP 272, or one or more other processors may perform image processing associated with the first image capture stream 202. For example, one or more of the ISP 222, the ISP 272, or one or more other processors may adjust the decoded image data 220 based on the decoded autofocus data 270. As an illustrative example, one or more of the ISP 222, the ISP 272, or one or more other processors may perform automatic focus (AF), automatic white balance (AWB), and automatic exposure control (AEC) (3A) parameter synchronization of the decoded image data 220 based on the decoded autofocus data 270, may produce a frame or a video file based on the decoded image data 220 and the decoded autofocus data 270, may configure one or more such frames or video files for display, storage, or transmission through a network connection, or a combination thereof, as illustrative examples.

Figure 3:
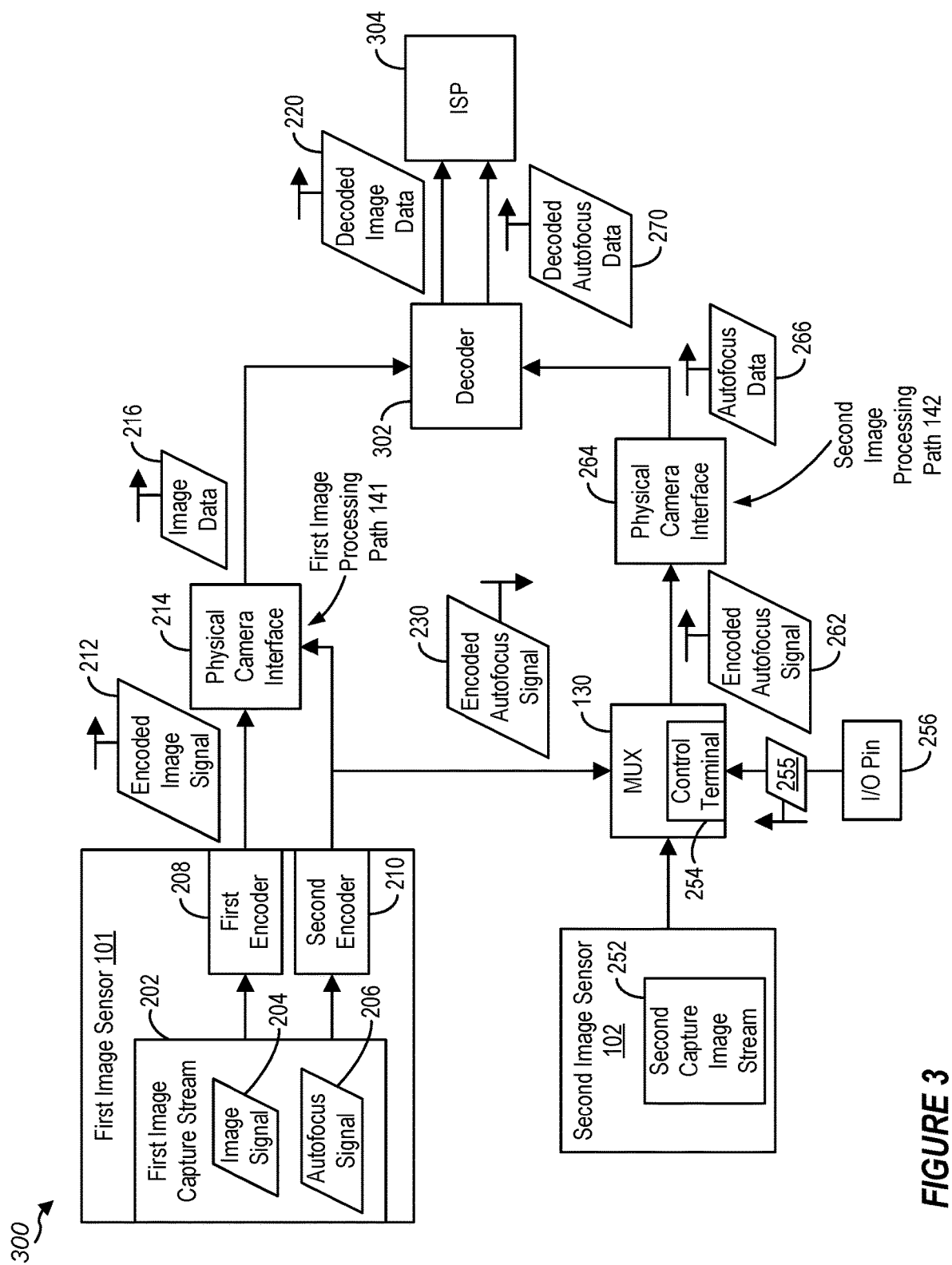
FIG. 3 is a diagram of another example device for image processing resource sharing among image sensors according to some aspects of the disclosure.

FIG. 3 is a diagram of an example device 300 for image processing resource sharing among image sensors according to some aspects of the disclosure. The device 300 may include one or more features described with reference to one or more of FIGS. 1 and 2. For example, the device 300 may include the first image sensor 101, the second image sensor 102, the MUX 130, the first image processing path 141, and the second image processing path 142. In some examples, the device 300 is included in or corresponds to the device 100 of FIG. 1. FIG. 3 also illustrates that the first image processing path 141 may include the physical camera interface 214 and that the second image processing path 142 may include the physical camera interface 264.

Further, in the example of FIG. 3, the device 300 may include a decoder 302 and an ISP 304. The decoder 302 may be coupled to the first image processing path 141 (e.g., to the physical camera interface 214) and to the second image processing path 142 (e.g., to the physical camera interface 264). The decoder 302 may also be coupled to the ISP 304. In some examples, the decoder 302 may include parallel connections to the ISP 304. In some other examples, the decoder 302 may include one or more serial connections to the ISP 304. In some examples, the ISP 304 may be included in or may correspond to the one or more ISPs 112 of FIG. 1.

During operation, the MUX 130 may selectively couple the second image processing path 142 to the first image sensor 101 or to the second image sensor 102, such as described with reference to one or more of FIGS. 1 and 2. For example, the MUX 130 may selectively couple the second image processing path 142 to the first image sensor 101 or to the second image sensor 102 based on whether the resource availability parameter 144 of FIG. 1 satisfies a resource availability condition, such as by exceeding the threshold 146.

Further, the decoder 302 and the ISP 304 may perform processing operations associated with both the first image sensor 101 and the second image sensor 102. For example, the decoder 302 may receive the image data 216 and may decode the image data 216 to generate the decoded image data 220. The decoder 302 may also receive the autofocus data 266 and may decode the autofocus data 266 to generate decoded autofocus data 270. The ISP 304 may receive the decoded image data 220 and the decoded autofocus data 270 from the decoder 302 and may perform image processing of the decoded image data 220 and the decoded autofocus data 270.

To further illustrate, in some examples, the ISP 304 may adjust the decoded image data 220 based on the decoded autofocus data 270. As an illustrative example, the ISP 304 may perform automatic focus (AF), automatic white balance (AWB), and automatic exposure control (AEC) (3A) parameter synchronization of the decoded image data 220 based on the decoded autofocus data 270, may produce a frame or a video file based on the decoded image data 220 and the decoded autofocus data 270, may configure one or more such frames or video files for display, storage, or transmission through a network connection, or a combination thereof, as illustrative examples.

Figure 4:
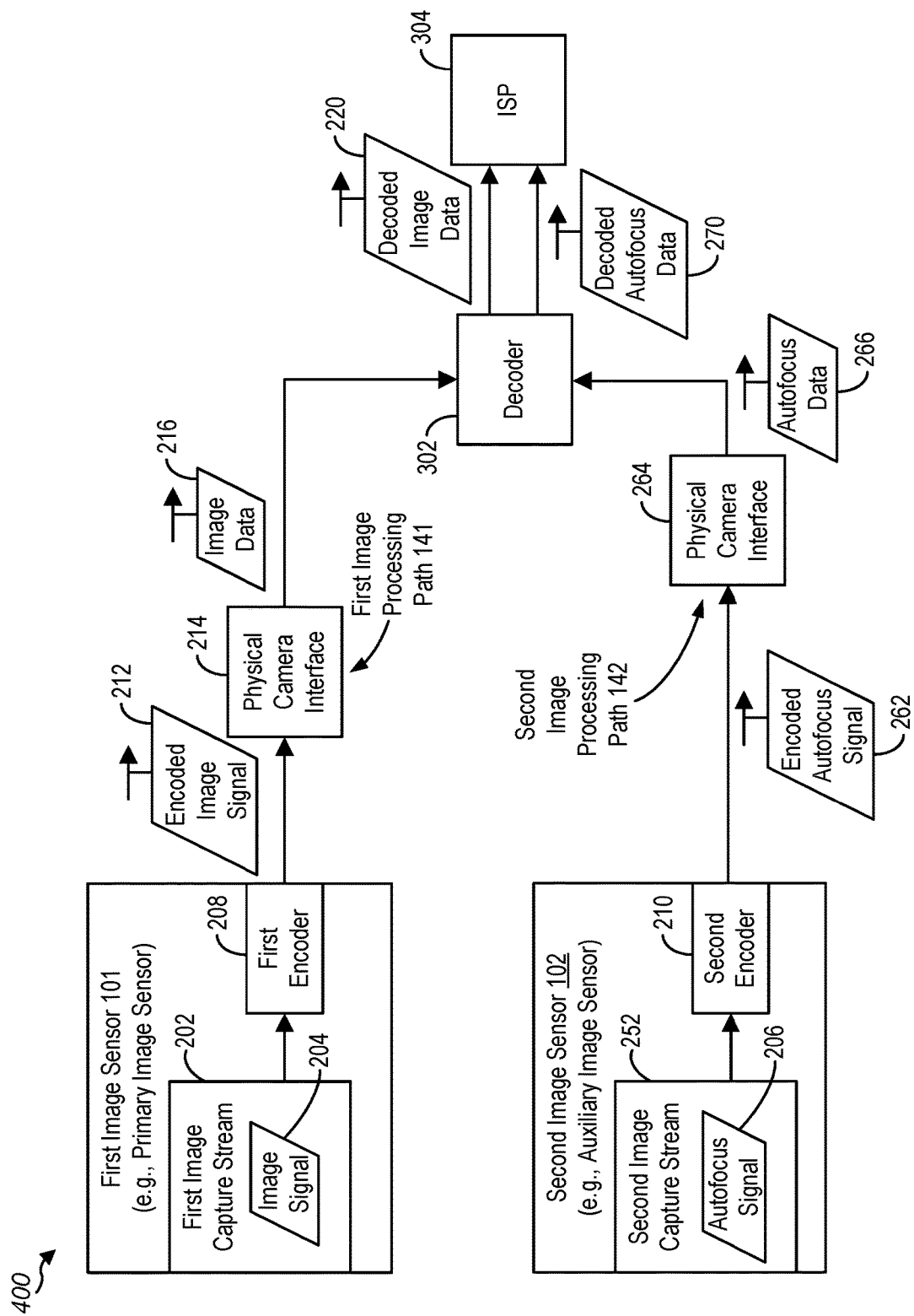
FIG. 4 is a diagram of another example device for image processing resource sharing among image sensors according to some aspects of the disclosure.

FIG. 4 is a diagram of an example device 400 for image processing resource sharing among image sensors according to some aspects of the disclosure. The device 400 may include one or more features described with reference to one or more of FIGS. 1-3. For example, the device 400 may include the first image sensor 101, the second image sensor 102, the first image processing path 141, and the second image processing path 142. In some examples, the device 400 is included in or corresponds to the device 100 of FIG. 1. FIG. 4 also illustrates that the first image processing path 141 may include the physical camera interface 214 and that the second image processing path 142 may include the physical camera interface 264. The decoder 302 may be coupled to the first image processing path 141 (e.g., to the physical camera interface 214) and to the second image processing path 142 (e.g., to the physical camera interface 264). The decoder 302 may also be coupled to the ISP 304.

Further, in the example of FIG. 4, the first image sensor 101 may include one or more encoders including the first encoder 208, and the second image sensor 102 may include one or more encoders including the second encoder 210. In some examples, the first image sensor 101 may correspond to a primary image sensor of the device 400, and the second image sensor 102 may correspond to an auxiliary image sensor of the device 400. In some other examples, the first image sensor 101 may correspond to an auxiliary image sensor of the device 400, and the second image sensor 102 may correspond to a primary image sensor of the device 400.

During operation, in at least some modes of operation, the first image sensor 101 and the first image processing path 141 may perform one or more operations cooperatively with the second image sensor 102 and the second image processing path 142. For example, the device 400 may cooperatively perform such operations based on the resource availability parameter 144 satisfying a resource availability condition, such as by exceeding the threshold 146. In some implementations, the first image sensor 101 and the first image processing path 141 may generate the image signal 204, the encoded image signal 212, and the image data 216, and the second image sensor 102 and the second image processing path 142 may generate the autofocus signal 206, the encoded autofocus signal 262, and the autofocus data 266. In some such examples, the second image sensor 102 and the second image processing path 142 may share idle image processing resources, such as by generating and processing the autofocus signal 206 on behalf of the first image sensor 101 and the first image processing path 141.

After generating and processing the autofocus signal 206 to generate the autofocus data 266, the decoder 302 may receive the image data 216 and the autofocus data 266. The decoder 302 may decode the image data 216 to generate the decoded image data 220 and may decode the autofocus data 266 to generate the decoded autofocus data 270. The ISP 304 may receive the decoded image data 220 and the decoded autofocus data 270 and may perform image processing based on the decoded image data 220 and the decoded autofocus data 270. For example, the ISP 304 may generate a single image or single stream of images based on the decoded image data 220 and the decoded autofocus data 270.

In some examples, the second image sensor 102 and the second image processing path 142 may operate as an auxiliary image processing path based on one or more criteria. For example, if the second image sensor 102 is associated with a particular mode (such as an idle mode), the ISP 304 may reassign (or "offload") autofocus image processing operations from the first image sensor 101 and the first image processing path 141 to the second image sensor 102 and the second image processing path 142. To illustrate, in some examples, the ISP 304 may perform such reassignment based on the resource availability parameter 144 exceeding the threshold 146. In such examples, if the second image sensor 102 generates additional image data of the second image capture stream 252 that is associated with the autofocus signal 206, the second image sensor 102 may discard the additional image data based on image processing resources of the second image processing path 142 being assigned to the first image sensor 101 and the first image processing path 141. In other examples, the second image sensor 102 may avoid generating such additional image data based on image processing resources of the second image processing path 142 being assigned to the first image sensor 101 and the first image processing path 141.

In some other examples, the second image sensor 102 and the second image processing path 142 may be unavailable for resource sharing. In some such examples, the device 400 may perform separate image processing associated with the first image processing path 141 and the second image processing path 142. For example, if the device 400 detects that the second image sensor 102 is active (instead of being idle), the device 400 may instruct the first image sensor 101 and the first image processing path 141 to perform both image capture operations and autofocus operations (e.g., instead of "offloading" such autofocus operations to the second image sensor 102 and the second image processing path 142).

Figure 5:
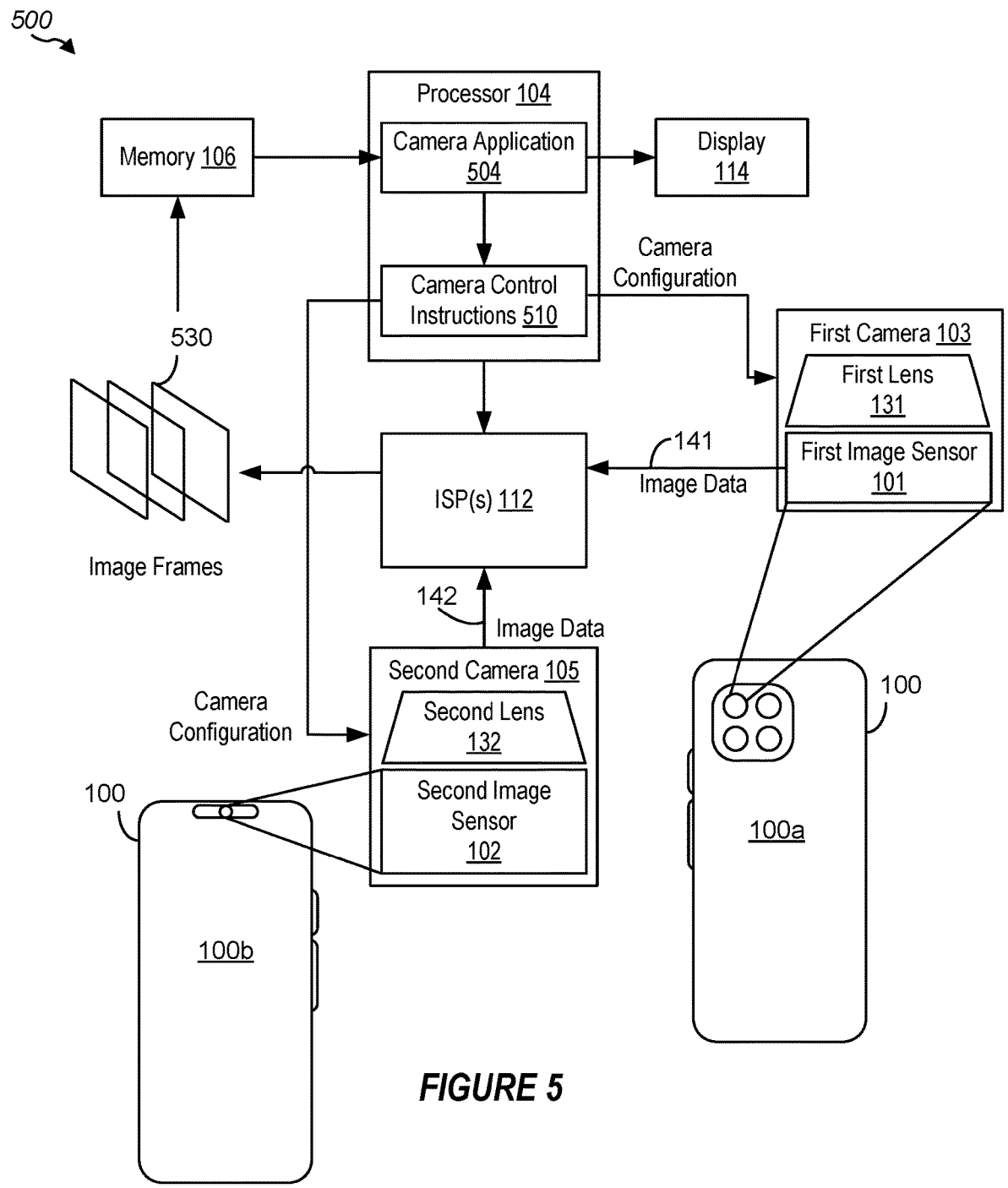
FIG. 5 is a diagram illustrating an example data flow for image processing resource sharing among image sensors according to some aspects of the disclosure.

FIG. 5 is a diagram illustrating an example data flow 500 for image processing resource sharing among image sensors according to some aspects of the disclosure. The data flow 500 of FIG. 5 is described with reference to the device 100. Alternatively, or in addition, the data flow 500 may be described with reference to one or more of the devices 200, 300, and 400.

The example of FIG. 5 illustrates that the device 100 may be implemented as a mobile device, such as a smart phone. In some other examples, the device 100 may be implemented as another device, such as a standalone camera or as a wearable device, such as a headset. In FIG. 5, the device 100 may include a first surface 100a (e.g., a back-facing surface) and a second surface 100b (e.g., a front-facing surface) different than the first surface 100a. The first image sensor 101 may be positioned on the first surface 100a, and the second image sensor 102 may be positioned on the second surface 100b. In some other examples, the second image sensor 102 may be positioned on the first surface 100a, and the first image sensor 101 may be positioned on the second surface 100b.

During operation, the processor 104 may communicate with the one or more ISPs 112, such as through a bi-directional bus and/or separate control and data lines. The processor 104 may control the first camera 103 and the second camera 105, such as by executing camera control instructions 510. The camera control instructions 510 may include a camera driver executed by the processor 104 for configuring the first camera 103 and the second camera 105, such as to activate or deactivate image capture, to configure exposure settings, to configure aperture size, to perform one or more other operations, or a combination thereof. Camera control instructions 510 may be managed by a camera application 504 executed by the processor 104. The camera application 504 may provide settings accessible to a user to enable the user to specify individual camera settings or to select a profile with corresponding camera settings. The processor 104 may execute the camera control instructions 510 to configure the first camera 103 and the second camera 105 in accordance with commands received from the camera application 504. The camera application 504 may be, for example, a photography application, a document scanning application, a messaging application, or other application that processes image data acquired from one or more of the first camera 103 or the second camera 105.

The camera configuration may include parameters that specify, for example, a frame rate, an image resolution, a readout duration, an exposure level, an aspect ratio, an aperture size, etc. The first camera 103 and the second camera 105 may apply a respective camera configuration and may obtain image data representing a scene using the camera configuration. In some embodiments, the camera configuration may be adjusted to obtain different representations of the scene. For example, the processor 104 may execute the camera application 504 to instruct the first camera 103, through camera control instructions 510, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration. As another example, the processor 104 may execute the camera application 504 to instruct the second camera 105, through camera control instructions 510, to set a third camera configuration for the second camera 105, to obtain third image data from the second camera 105 operating in the third camera configuration, to instruct the second camera 105 to set a fourth camera configuration for the second camera 105, and to obtain fourth image data from the second camera 105 operating in the fourth camera configuration.

In some embodiments in which the first camera 103 is a variable aperture (VA) camera system, the processor 104 may execute the camera application 504 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from one or more of the first camera 103 or the second camera 105 may be processed in one or more blocks of the one or more ISPs 112 to determine one or more output image frames 530 that may be stored in memory 106 and/or otherwise provided to the processor 104. The processor 104 may further process the image data to apply effects to the one or more output image frames 530. Effects may include Bokeh, lighting, color casting, and/or high dynamic range (HDR) merging. In some embodiments, one or more such effects may be applied in the one or more ISPs 112 (e.g., alternatively or in addition to applying one or more such effects by the processor 104).

Figure 6:
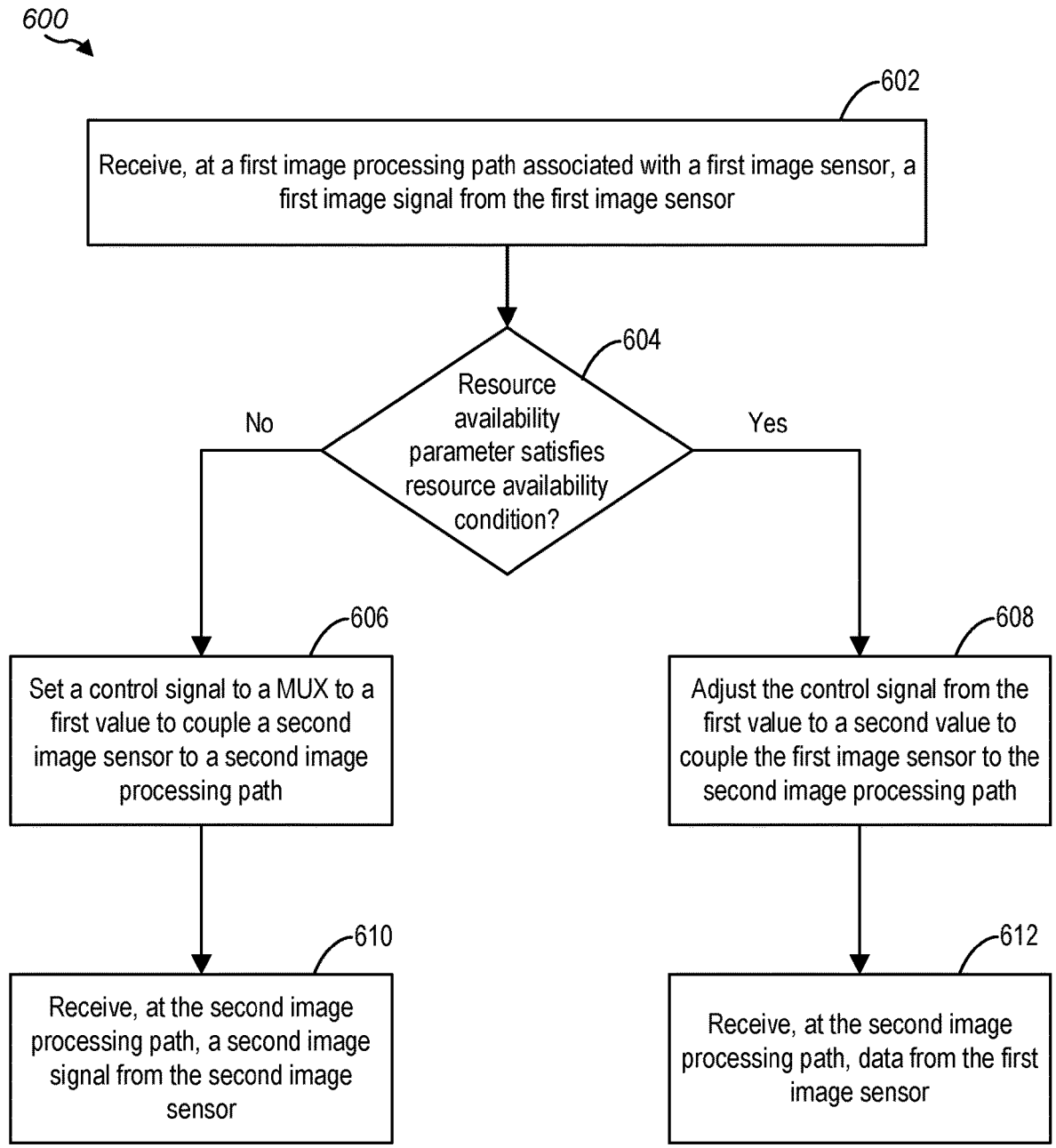
FIG. 6 is a flow diagram illustrating an example method for image processing resource sharing among image sensors according to some aspects of the disclosure.

FIG. 6 is a flow diagram illustrating an example method 600 for image processing resource sharing among image sensors according to some aspects of the disclosure. In some examples, the method 600 may be performed by the device 100 of FIG. 1, by the device 200 of FIG. 2, by the device 300 of FIG. 3, or by another device. In some examples, one or more operations of the method 600 may be initiated, performed, or controlled by one or more processors, such as the processor 104, the one or more ISPs 112, the ISP 222, the ISP 272, or the ISP 304, as illustrative examples.

At 602, the method 600 includes receiving, at a first image processing path, a first image signal associated with a first image sensor. For example, the first image processing path 141 may receive the encoded image signal 212 (e.g., from the first encoder 208).

At 604, the method 600 further includes determining whether a resource availability parameter satisfies a resource availability condition, such as the threshold 146. For example, the one or more processors may compare the resource availability parameter 144 to the threshold 146 to determine whether the resource availability parameter satisfies the resource availability condition. In some such examples, the resource availability parameter may satisfy the resource availability condition if the resource availability parameter 144 exceeds the threshold 146. In other such examples, the resource availability parameter may fail to satisfy the resource availability condition if the resource availability parameter 144 fails to exceed the threshold 146.

If the resource availability parameter fails to satisfy the resource availability condition, the method 600 may include setting a control signal to a MUX to a first value to couple a second image sensor to a second image processing path, at 606. For example, the one or more processors may set the control signal 255 to the MUX 130 to the first value (such as a logic "0" value or a logic "1" value) to couple the second image sensor 102 to the second image processing path 142. In addition, at 610, the method 600 may further include receiving, at the second image processing path, a second image signal from the second image sensor. For example, the second image processing path 142 may receive the encoded autofocus signal 262 from the second image sensor 102.

In some other examples, the resource availability parameter may satisfy the resource availability condition. In such examples, the method 600 may include adjusting the control signal to the MUX from the first value to a second value to couple the first image sensor to the second image processing path, at 608. For example, the one or more processors may set the control signal 255 to the MUX 130 to the second value (such as a logic "1" value or a logic "0" value) to couple the first image sensor 101 to the second image processing path 142. In addition, at 612, the method 600 may further include receiving, at the second image processing path, data from the first image sensor. For example, the second image processing path 142 may receive the encoded autofocus signal 230 from the first image sensor 101.

Figure 7:
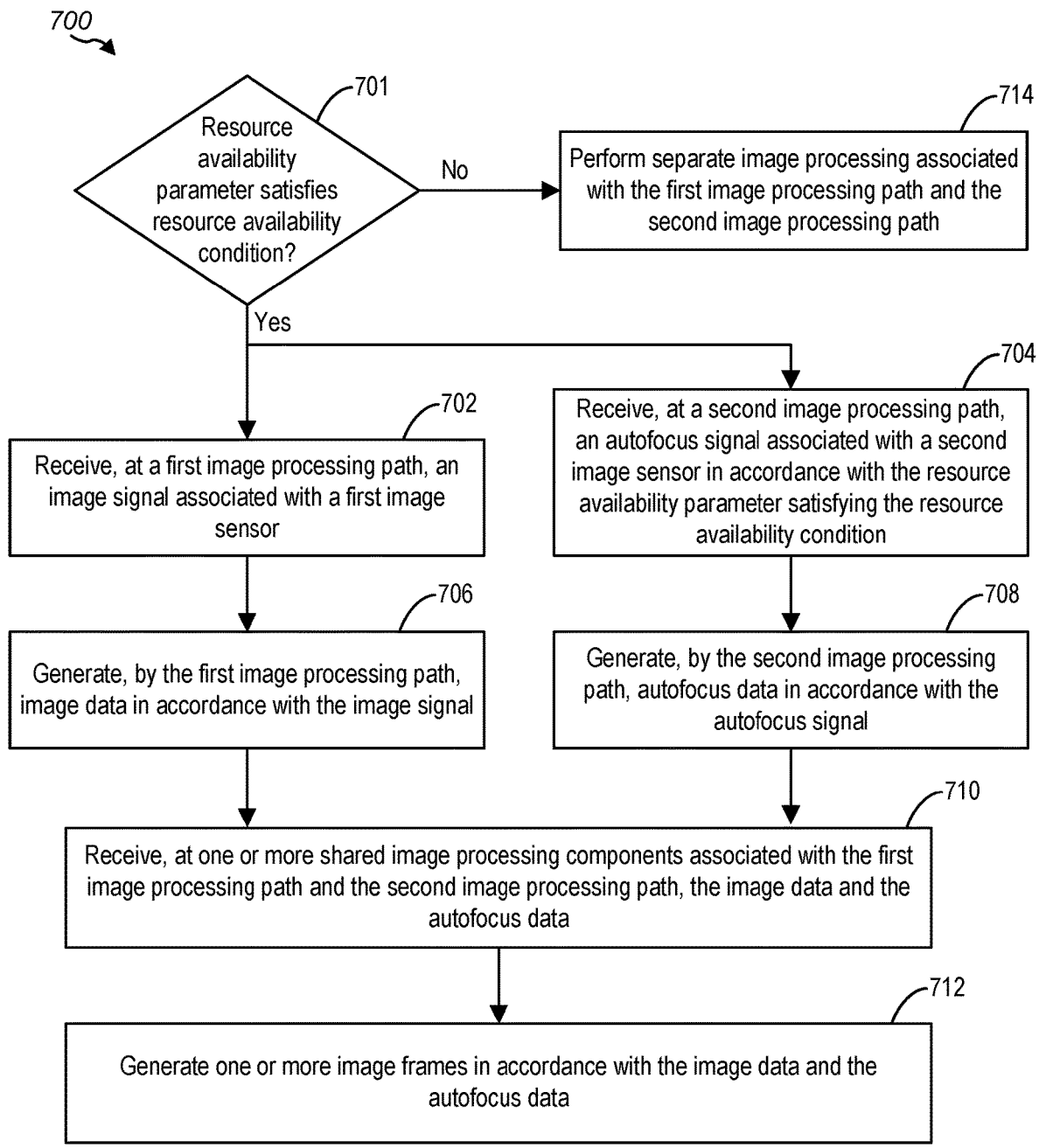
FIG. 7 is a flow diagram illustrating another example method for image processing resource sharing among image sensors according to some aspects of the disclosure.

FIG. 7 is a flow diagram illustrating an example method 700 for image processing resource sharing among image sensors according to some aspects of the disclosure. In some examples, the method 700 may be performed by the device 100 of FIG. 1, by the device 400 of FIG. 4, or by another device. In some examples, one or more operations of the method 700 may be initiated, performed, or controlled by one or more processors, such as the processor 104, the one or more ISPs 112, the ISP 222, the ISP 272, or the ISP 304, as illustrative examples.

At 701, the method 700 may include determining whether a resource availability parameter satisfies a resource availability condition, such as the threshold 146. For example, the one or more processors may compare the resource availability parameter 144 to the threshold 146 to determine whether the resource availability parameter satisfies the resource availability condition. In some such examples, the resource availability parameter may satisfy the resource availability condition if the resource availability parameter 144 exceeds the threshold 146. In other such examples, the resource availability parameter may fail to satisfy the resource availability condition if the resource availability parameter 144 fails to exceed the threshold 146.

If the resource availability parameter satisfies the resource availability condition, the method 700 may further include receiving, at a first image processing path, an image signal associated with a first image sensor, at 702. For example, the first image processing path 141 may receive the encoded image signal 212 associated with the first image sensor 101.

At 704, the method 700 further includes receiving, at a second image processing path, an autofocus signal associated with a second image sensor in accordance with the resource availability parameter satisfying the resource availability condition. For example, the second image processing path 142 may receive the encoded autofocus signal 262 associated with the second image sensor 102.

At 706, the method 700 further includes generating image data in accordance with the image signal. For example, the physical camera interface 214 may generate the image data 216 in accordance with the encoded image signal 212.

At 708, the method 700 further includes generating autofocus data in accordance with the autofocus signal. For example, the physical camera interface 264 may generate the autofocus data 266 in accordance with the encoded autofocus signal 262.

At 710, the method 700 further includes receiving, at one or more shared image processing components associated with the first image processing path and the second image processing path, the image data and the autofocus data. To illustrate, in some implementations, the one or more shared image processing components may include a decoder, such as the decoder 302. Alternatively, or in addition, in some other implementations, the one or more shared image processing components may include an ISP, such as the one or more ISPs 112 or the ISP 304.

In some other examples, the resource availability parameter may fail to satisfy the resource availability condition. In some such examples, the method 700 may further include performing separate image processing associated with the first image processing path and the second image processing path, at 714. For example, if the device 400 detects that the second image sensor 102 is active (instead of being idle), the device 400 may instruct the first image sensor 101 and the first image processing path 141 to perform both image capture operations and autofocus operations (e.g., instead of "offloading" such autofocus operations to the second image sensor 102 and the second image processing path 142).

Although certain examples are provided for illustration, it will be appreciated that other examples are also within the scope of the disclosure. For example, although two image processing paths may be described in some implementations, other implementations may use a different quantity of image processing paths, such as three image processing paths, four image processing paths, or another quantity of image processing paths. Further, in some implementations, the MUX 130 may be coupled to more than two image processing paths, such as to three image processing paths, four image processing paths, or another quantity of image processing paths. In such examples, the MUX 130 may include more than two inputs, such as three inputs, fourth inputs, or another quantity of inputs. Further, the control signal 255 may correspond to a multi-bit control signal that can indicate a selected input of more than two inputs, such as three inputs, fourth inputs, or another quantity of inputs.

One or more components or devices described herein may be utilized in a variety of electronic devices. For example, components and devices described herein may be implemented in a mobile device (such as a cellular telephone), a standalone camera, a wearable device (such as a headset), or another electronic device, as illustrative examples. Features described herein may be utilized in one or more types of applications including virtual reality (VR) applications, augmented reality (AR) applications, or extended reality (XR) applications. To further illustrate, in some examples, the camera application 504 may correspond to a VR, AR, or XR application (such as a game or simulation), and the device 100 may correspond to a wearable device, such as a VR, AR, or XR headset. Other examples are also within the scope of the disclosure.

One or more features described with reference to FIGS. 1-7 may improve performance of an image capture device. For example, dynamically reassigning resources from one image sensor to another image sensor (such as from the first image sensor 101 to the second image sensor 102, or vice versa) may improve performance of an electronic device (such as any of the devices 100, 200, 300, and 400). To further illustrate, by dynamically reassigning resources from one image sensor to another image sensor, a device may avoid initiating a "turbo" mode of operation. Further, an idle (or "sleeping") image sensor (such as one of the first image sensor 101 or the second image sensor 102) may remain in an idle or sleep mode while image processing resources associated with the idle or sleeping image sensor are shared with another image sensor (such as the other of the first image sensor 101 or the second image sensor 102). As a result, power consumption may be reduced without increasing latency.

In a first aspect, an apparatus includes a first image processing path associated with a first image sensor, a second image processing path associated with a second image sensor, and a multiplexer (MUX). The MUX is configured to provide data from the first image sensor to the second image processing path in accordance with a resource availability parameter associated with the second image processing path satisfying a resource availability condition.

In a second aspect, in combination with the first aspect, the resource availability parameter is associated with a particular mode of operation of the second image sensor.

In a third aspect, in combination with one or more of the first aspect or the second aspect, the particular mode of operation includes an idle mode of operation of the second image sensor, and the resource availability parameter satisfies the resource availability condition based on the second image sensor being associated with the idle mode of operation for at least a particular time interval.

In a fourth aspect, in combination with one or more of the first aspect through the third aspect, the first image sensor includes a first encoder configured to generate an encoded image signal in accordance with a first image capture stream associated with the first image sensor and a second encoder configured to generate encoded autofocus signal in accordance with the first image capture stream. The MUX is further configured to provide, as the data, one of the encoded autofocus signal or a signal associated with a second image capture stream to the second image processing path.

In a fifth aspect, in combination with one or more of the first aspect through the fourth aspect, the second image sensor is configured to generate the second image capture stream, and the MUX is further configured to provide the signal associated with the second image capture stream to the second image processing path in accordance with the resource availability parameter failing to satisfy the resource availability condition.

In a sixth aspect, in combination with one or more of the first aspect through the fifth aspect, the first image sensor is positioned on a first surface of the apparatus, and the second image sensor is positioned on a second surface of the apparatus different than the first surface.

In a seventh aspect, in combination with one or more of the first aspect through the sixth aspect, the apparatus further includes an input/output (I/O) pin that is coupled to a control terminal of the MUX.

In an eighth aspect, in combination with one or more of the first aspect through the seventh aspect, the first image processing path and the second image processing path each include one or more of a physical camera interface, a decoder, or an image signal processor (ISP).

In a ninth aspect, in combination with one or more of the first aspect through the eighth aspect, the apparatus further includes a first physical camera interface of the first image processing path and a second physical camera interface of the second image processing path. The first physical camera interface is coupled to the first image sensor, and the second physical camera interface is coupled to the MUX. The apparatus further includes a decoder coupled to the first physical camera interface and to the second physical camera interface.

In a tenth aspect, in combination with one or more of the first aspect through the ninth aspect, the apparatus further includes an image signal processor (ISP) coupled to the decoder.

In an eleventh aspect, an apparatus includes a first image processing path configured to receive an image signal associated with a first image sensor and to generate image data in accordance with the image signal. The apparatus further includes a second image processing path configured to receive, in accordance with a resource availability parameter associated with the second image processing path satisfying a resource availability condition, an autofocus signal associated with a second image sensor and to generate autofocus data in accordance with the autofocus signal. The apparatus further includes a decoder configured to receive the image data from the first image processing path and to receive the autofocus data from the second image processing path.

In a twelfth aspect, in combination with the eleventh aspect, the decoder is further configured to generate decoded image data in accordance with the image data and to generate decoded autofocus data in accordance with the autofocus data.

In a thirteenth aspect, in combination with one or more of the eleventh aspect through the twelfth aspect, the apparatus further includes an image signal processor (ISP) coupled to the decoder and configured to perform image processing based on the decoded image data and the decoded autofocus data.

In a fourteenth aspect, in combination with one or more of the eleventh aspect through the thirteenth aspect, the first image sensor corresponds to a primary image sensor of the apparatus, and the second image sensor corresponds to an auxiliary image sensor of the apparatus.

In a fifteenth aspect, in combination with one or more of the eleventh aspect through the fourteenth aspect, the first image sensor is configured to generate a first image capture stream that includes the image data, the second image sensor is configured to generate a second image capture stream that includes the autofocus data, and the second image sensor is further configured to discard or avoid generating additional image data of the second image capture stream that is associated with the autofocus data.

In a sixteenth aspect, a method includes receiving, at a first image processing path, a first image signal associated with a first image sensor. The method further includes, based on a resource availability parameter associated with a second image processing path satisfying a resource availability condition, receiving data from the first image sensor at the second image processing path. The second image processing path is associated with a second image sensor.

In a seventeenth aspect, in combination with the sixteenth aspect, the data is provided from the first image sensor to the second image processing path via a multiplexer (MUX).

In an eighteenth aspect, in combination with one or more of the sixteenth aspect through the seventeenth aspect, the method further includes adjusting a control signal to the MUX from a first value to a second value to enable the MUX to couple the first image sensor to the second image processing path.

In a nineteenth aspect, in combination with one or more of the sixteenth aspect through the eighteenth aspect, the method further includes, based on a change associated with the resource availability parameter, setting the control signal to the first value to couple the second image sensor to the second image processing path.

In a twentieth aspect, a method includes receiving, at a first image processing path, an image signal associated with a first image sensor. The method further includes generating image data in accordance with the image signal and receiving, at a second image processing path, an autofocus signal associated with a second image sensor in accordance with a resource availability parameter associated with the second image processing path satisfying a resource availability condition. The method further includes generating autofocus data in accordance with the autofocus signal and receiving, at one or more shared image processing components associated with the first image processing path and the second image processing path, the image data and the autofocus data.

In a twenty-first aspect, in combination with the twentieth aspect, the one or more shared image processing components include a decoder.

In a twenty-second aspect, in combination with one or more of the twentieth aspect through the twenty-first aspect, the one or more shared image processing components include an image signal processor (ISP).

In a twenty-third aspect, in combination with one or more of the twentieth aspect through the twenty-second aspect, the one or more shared image processing components include a decoder and an image signal processor (ISP).

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art will recognize that although some features are described separately for convenience, such features may be combined without departing from the scope of the disclosure. To illustrate, one or more blocks (or operations) described with reference to FIGS. 1-7 may be combined with one or more blocks (or operations) described with reference to another of FIGS. 1-7. For example, in some aspects, a device may operate in accordance with both the method 600 of FIG. 6 and the method 700 of FIG. 7.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media include computer storage media. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
    a first image processing path associated with a first image sensor;
    a second image processing path associated with a second image sensor; and
    a multiplexer (MUX) configured to provide data from the first image sensor to the second image processing path in accordance with an idle time interval associated with the second image processing path exceeding a particular time interval.

2. The apparatus of claim 1, wherein the idle time interval exceeds the particular time interval based on the second image sensor being associated with an idle mode of operation for at least a particular time interval.

3. The apparatus of claim 1, wherein the first image sensor includes:
    a first encoder configured to generate an encoded image signal in accordance with a first image capture stream associated with the first image sensor; and
    a second encoder configured to generate encoded autofocus signal in accordance with the first image capture stream,
    wherein the MUX is further configured to provide, as the data, one of the encoded autofocus signal or a signal associated with a second image capture stream to the second image processing path.

4. The apparatus of claim 3, wherein the second image sensor is configured to generate the second image capture stream, and wherein the MUX is further configured to provide the signal associated with the second image capture stream to the second image processing path in accordance with the idle time interval failing to exceed the particular time interval.

5. The apparatus of claim 1, wherein the first image sensor is positioned on a first surface of the apparatus, and wherein the second image sensor is positioned on a second surface of the apparatus different than the first surface.

6. The apparatus of claim 1, further comprising an input/output (I/O) pin, wherein the I/O pin is coupled to a control terminal of the MUX.

7. The apparatus of claim 1, wherein the first image processing path and the second image processing path each include one or more of a physical camera interface, a decoder, or an image signal processor (ISP).

8. The apparatus of claim 1, further comprising:
    a first physical camera interface of the first image processing path, the first physical camera interface coupled to the first image sensor;
    a second physical camera interface of the second image processing path, the second physical camera interface coupled to the MUX; and
    a decoder coupled to the first physical camera interface and to the second physical camera interface.

9. The apparatus of claim 8, further comprising an image signal processor (ISP) coupled to the decoder.

10. The apparatus of claim 1, wherein the first image sensor is configured to generate a first signal and a second signal, wherein the first image processing path is configured to receive the first signal from the first image sensor, and wherein the second image processing path is configured to receive, as the data, the second signal from the MUX.

11. The apparatus of claim 10, wherein the first signal corresponds to one of an image signal or an autofocus signal, and wherein the second signal corresponds to the other of the image signal or the autofocus signal.

12. The apparatus of claim 1, wherein the idle time interval exceeds the particular time interval in accordance with a timestamp indicating that the second image sensor is associated with an idle mode of operation for at least the particular time interval.

13. An apparatus comprising:
a first image processing path configured to receive an image signal associated with a first image sensor and to generate image data in accordance with the image signal;
a second image processing path configured to receive, in accordance with a resource availability parameter associated with the second image processing path satisfying a resource availability condition, an autofocus signal associated with a second image sensor and to generate autofocus data in accordance with the autofocus signal; and
a decoder configured to receive the image data from the first image processing path and to receive the autofocus data from the second image processing path.

14. The apparatus of claim 13, wherein the decoder is further configured to generate decoded image data in accordance with the image data and to generate decoded autofocus data in accordance with the autofocus data.

15. The apparatus of claim 14, further comprising an image signal processor (ISP) coupled to the decoder and configured to perform image processing based on the decoded image data and the decoded autofocus data.

16. The apparatus of claim 13, wherein the first image sensor corresponds to a primary image sensor of the apparatus, and wherein the second image sensor corresponds to an auxiliary image sensor of the apparatus.

17. The apparatus of claim 13, wherein the first image sensor is configured to generate a first image capture stream that includes the image data, wherein the second image sensor is configured to generate a second image capture stream that includes the autofocus data, and wherein the second image sensor is further configured to discard or avoid generating additional image data of the second image capture stream that is associated with the autofocus data.

18. A method comprising:
receiving, at a first image processing path, a first image signal associated with a first image sensor; and
based on an idle time interval associated with a second image processing path exceeding a particular time interval, receiving data from the first image sensor at the second image processing path, the second image processing path being associated with a second image sensor.

19. The method of claim 18, wherein the data is provided from the first image sensor to the second image processing path via a multiplexer (MUX).

20. The method of claim 19, further comprising adjusting a control signal to the MUX from a first value to a second value to enable the MUX to couple the first image sensor to the second image processing path.

21. The method of claim 20, further comprising, based on a change associated with a mode of operation of the second image sensor, setting the control signal to the first value to couple the second image sensor to the second image processing path.

22. A method comprising:
receiving, at a first image processing path, an image signal associated with a first image sensor;
generating image data in accordance with the image signal;
receiving, at a second image processing path, an autofocus signal associated with a second image sensor in accordance with an idle time interval associated with the second image processing path satisfying a particular time interval;
generating autofocus data in accordance with the autofocus signal; and
receiving, at one or more shared image processing components associated with the first image processing path and the second image processing path, the image data and the autofocus data.

23. The method of claim 22, wherein the one or more shared image processing components include one or more of a decoder or an image signal processor (ISP).

* * * * *